United States Patent [19]

Duddey

[11] 3,821,169

[45] June 28, 1974

[54] CATIONICALLY DYEABLE POLYESTERS WITH HYDROXYALKYLATED ISETHIONIC ACID

[75] Inventor: James E. Duddey, Akron, Ohio

[73] Assignee: The Goodyear Tire & Rubber Company, Akron, Ohio

[22] Filed: Aug. 17, 1972

[21] Appl. No.: 281,598

[52] U.S. Cl............ 260/77, 8/DIG. 4, 260/45.95, 260/75 S, 260/513 R
[51] Int. Cl............................................. C08g 17/18
[58] Field of Search............................. 260/75 S, 77

[56] References Cited
UNITED STATES PATENTS 3,636,131  1/1972  Davis et al........................ 260/75 S
3,649,571  3/1972  Keck................................. 260/22 D

FOREIGN PATENTS OR APPLICATIONS 2,063,267  7/1971  Germany

*Primary Examiner*—Melvin Goldstein
*Attorney, Agent, or Firm*—F. W. Brunner; J. P. Ward

[57] ABSTRACT

There is disclosed a method for preparing cationically dyeable highly polymeric linear polyester and copolyester resins which comprises adding to a multi-step polyester or copolyester forming process at least one compound selected from the group consisting of hydroxyalkylene oxide and hydroxypoly(alkylene oxide) derivatives of metallic salts of isethionic acid.

3 Claims, No Drawings

CATIONICALLY DYEABLE POLYESTERS WITH HYDROXYALKYLATED ISETHIONIC ACID

This invention relates to the preparation of highly polymeric polyester and copolyester resins having improved cationic dye receptivity and to the products prepared from these resins.

It is known that highly polymeric polyester and copolyester resins can be prepared by means of multi-step processes such as the direct esterification-polycondensation and transesterification-polycondensation processes. It is also known that the addition of metallic salts of isethionic acid to these processes prior to the condensation step produces highly polymeric polyester resins having improved dyeability and particularly improved cationic dyeability. However, the use of metallic salts of isethionic acid in highly polymeric polyester resin forming processes has been observed to give rise to several drawbacks. First, the decomposition of these salts induced by the reaction conditions of the polyester forming process, gives rise to polyester resins containing numerous black particles which adversely affect not only the color and clarity of the final polyester resin but also adversely affect the physical characteristics of the ultimate product to which the polyester resin formed is converted, such as films and fibers. Second, the use of these salts gives rise to polyester resins which are hazy in appearance due to the limited solubility of unreacted isethionic acid salts in polyester resins.

It is an object of this invention to prepare highly polymeric linear polyester and copolyester resins and films and fibers derived therefrom which have improved cationic dyeability. It is a particular objective of this invention to provide compounds which are capable of imparting improved cationic dyeability to highly polymeric linear polyester and copolyester resins and films and fibers derived therefrom and which do not adversely affect either the physical appearance or the physical characteristics of said highly polymeric polyester and copolyester resins or the films and fibers produced therefrom. Other objects will become apparent from the following description and claims.

The term "highly polymeric" as used throughout this specification is defined to include those "polyesters" having intrinsic viscosities of at least 0.5 deciliter per gram. The word "polyester" is defined as including both homopolyester and copolyester resins.

In accordance with the teachings of this invention it has been found that highly polymeric linear polyester resins having improved cationic dye receptivity can be produced by adding to a multi-step polyester resin forming process a compound selected from the group consisting of hydroxy alkylene oxide derivatives of metallic salts of isethionic acid and hydroxy poly(alkyleneoxide) derivatives of metallic salts of isethionic acid which correspond to the general formula $HO[(CH_2)_xO]_nCH_2CH_2SO_3M$, where M is selected from the group consisting of alkali and alkaline earth metals, x is an integer from 2 to 10 and n is an integer ranging from about 1 to about 200, or sufficient to provide a poly(alkyleneoxide) derivative having a molecular weight of up to 10,000.

The multi-step polyester resin forming processes to which the present invention is applicable include any of the multi-step processes well known in the art. The present invention can be applied to both direct esterification-polycondensation and transesterification-polycondensation processes. Generally in direct esterification-polycondensation processes the first step comprises reacting a dicarboxylic acid with a glycol to form the desired diglycol ester of the dicarboxylic acid. This esterification reaction is carried out at temperatures ranging from 230° to 270° C. and pressures ranging from atmospheric to superatmospheric pressure. In the transesterification-polycondensation processes the first step comprises reacting a lower alkyl ester derivative of a dicarboxylic acid with a glycol to form the desired diglycol ester of the dicarboxylic acid. The interchange reaction is carried out at temperatures ranging from 210° to 250° C. and pressures ranging from atmospheric to superatmospheric pressures. Catalysts such as zinc acetate, manganese acetate, calcium acetate and alkali metal alcoholates are employed to effectuate the interchange reaction.

The second step or polycondensation reaction is generally performed in the same manner regardless of whether a direct esterification-polycondensation process is used. Thus, a diglycol ester of a dicarboxylic acid prepared by either an esterification or transesterification reaction is condensed to highly polymeric polyester resin by subjecting said diglycol ester to temperatures ranging from about 260° to 300° C. and pressures of 1.0 millimeter of mercury or less in the presence of catalysts such as antimony trioxide, lead acetate, litharge, titanium alcoholate and the like.

The invention is illustrated below employing a multi-step direct esterification-polycondensation process for preparing cationic dyeable, highly polymeric polyethylene terephthalate. Employing this same process the invention is also applicable to the preparation of various other cationic dyeable, highly polymeric polyesters of other acids and other glycols. For example, instead of terephthalic acid, other acids can be used. Representative examples of such other acids include aromatic dicarboxylic acids such as isophthalic acid, orthophthalic acid, 2,6-naphthanoic acid, p,p'-diphenyl dicarboxylic acid and the like; cycloaliphatic dicarboxylic acids such as hexahydroterephthalic acid and the like and aliphatic dicarboxylic acids such as adipic acid, suberic acid, azelaic acid, sebacic acid and the like. Further, instead of ethylene glycol, other glycols can be used. Representative examples of such other glycols include polymethylene glycols having from 2 to 10 methylene groups such as propylene glycol, tetramethylene glycol, neopentylene glycol, hexamethylene glycol and decamethylene glycol and the like; cyclohexane diols such as cyclohexane dimethanol and the like; di-β-hydroxyethoxy benzene, 2,2-bis[4(β-hydroxyethoxy)-phenyl] propane and similar varieties of glycols.

Furthermore, the invention can be applied to direct esterification-polycondensation processes to prepare cationic dyeable copolyesters such as terephthalate copolyesters and particularly copolyesters containing terephthalic acid as a major portion of the total acid component, i.e., those copolyesters containing from 60 to 90 mol percent of terephthatic acid based on the total acid component, the remainder of the acid component being one or more of the acids from the above mentioned acids or similar dicarboxylic acid.

The invention is also illustrated below employing a multi-step transesterification-polycondensation process wherein dimethyl terephthalate and ethylene glycol are reacted together to form bis(β-hydroxyethyl)

terephthalate which is then subjected to polycondensation conditions to produce a cationic dyeable poly(ethylene terephthalate). The invention, however, is applicable to the preparation of other dyeable polyesters from other diglycol esters of dicarboxylic acids prepared by conducting a transesterification reaction between various other glycols such as polymethylene glycols having from 2 to 10 methylene groups, cycloaliphatic and aromatic diols and various other lower alkyl esters of dicarboxylic acids such as those derived from saturated aliphatic monohydric alcohols containing from one to four carbon atoms and aromatic, aliphatic and cycloaliphatic dicarboxylic acids. Representative examples of other lower alkyl esters of dicarboxylic acids include the diethyl, dipropyl, diisopropyl, etc., esters of aromatic dicarboxylic acids such as orthophthalic acid, isophthalic acid, 2,7- and 2,6-naphthoic acid, p,p'-diphenyl dicarboxylic acid and the like; aliphatic dicarboxylic acids such as adipic acid, sebacic acid, suberic acid, azelaic acid and the like and cycloaliphatic dicarboxylic acids such as hexahydroterephthalic acid and the like. Representative examples of the various other glycols mentioned above include propylene glycol, tetramethylene glycol, hexamethylene glycol and decamethylene glycol, cyclohexane dimethanol, di-$\beta$-hydroxyethoxy benzene, 2,2,-bis[4($\beta$-hydroxyethoxy)phenyl] propane and similar varieties of glycols. The invention is also applicable to the preparation of cationic dyeable copolyesters prepared by carrying out a transesterification reaction between mixtures of the above lower alkyl esters and at least one of the above described glycols.

Various other materials can also be added to the processes to which the present invention is applicable in order to regulate certain of the physical characteristics of the polyesters produced or to impart thermal or oxidative stability to the polyesters or to produce chain branching in the polyesters to provide more chain end sites to incorporate a higher concentration of the derivatives of this invention. Representative examples of these additive materials include alkali metal compounds such as sodium hydroxide, potassium hydroxide, sodium acetate, potassium methoxide, sodium ethoxide and the like and tertiary amines such as ethyl dicyclohexylamine, tertiary butyl diethanolamine, cyclohexyldiethanolamine and the like for regulating the amount of diethylene glycol in the polyesters. Highly hindered phenolic compounds such as 2,6-di-t.-butyl-4-methyl phenol; 2,4,6-tri-t.-butyl phenol; 2,6-di-t.-butyl phenol; 1,3,5-trimethyl-2,4,6-tris-(3,5-di-t.-butyl-4-hydroxybenzyl) benzene; Irganox 1010 — a hindered phenolic antioxidant sold by Geigy Chemical Industries and having the formula

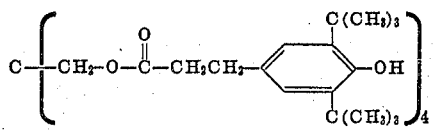

Age Rite Geltrol — an antioxidant sold by Vanderbilt Company which contains about 60 percent of a hindered phenolic phosphite prepared by the reaction of nonylphenyl phosphorodichlorodite with ditertiary butyl bis Phenol A and about 40 percent unreacted starting materials. Various other similar highly hindered phenols may be added for protecting the polyesters against oxidative and thermal degradation.

Chain branching agents such as trimethylol propane, glycerine, tetramethylol methane (pentaerythritol) and the like can also be employed to provide more chain end sites in the polyesters in order to incorporate a higher concentration of the sulfonate groups in the polyester system.

The polyester and copolyester resins and films and fibers produced from the polyesters and copolyesters prepared in accordance with this invention are particularly suitable for dyeing with "cationic dyes." The expression "cationic dyes" refers to colored organic materials which contain such groups as sulphonium, oxonium or quaternary ammonium. Polyester and copolyester resins and films and fibers produced from polyester resins of this invention are capable of being uniformly dyed by such cationic dyes. Generally these cationic dyes are employed in a hot aqueous solution and the techniques for applying these cationic dyes are well known. Representative examples of cationic dyes useful in this invention and identified by Color Index Numbers include Basic Red 18, Basic Yellow 13, Basic Blue 77, Basic Red 13, Basic Blue 87, Basic Orange 21, Basic Yellow 53, Basic Red 14 and other similar cationic dyes which are listed in Colour Index, 3rd Ed. (1971) and published by The Society of Dyers annd Colourists (Great Britain).

Polyesters prepared in accordance with the teachings of this invention are also susceptible to dyeing with disperse dyes. Representative examples of some useful disperse dyes include Disperse Red 94, Disperse Blue 87, Disperse Red 135, Disperse Orange 54 and the like. Generally these disperse dyes are applied in hot aqueous solutions with or without carriers in accordance with known techniques.

As stated above, the present invention resides in the discovery that hydroxy alkylene oxide and hydroxy poly(alkylene oxide) derivatives of metallic salts of isethionic acid corresponding to the general formula HO[(CH$_2$)$_x$O]$_n$CH$_2$CH$_2$SO$_3$M wherein M is selected from the group consisting of alkali and alkaline earth metals, x is an integer from 2 to 10 and n is an integer ranging from 1 to about 200 can be employed to impart improved cationic dyeability to highly polymeric polyester and copolyester resins. The preferred hydroxy alkylene oxide and hydroxypoly(alkylene oxide) derivatives corresponding to the above formula are those wherein the integer n ranges from 1 to about 50 and the most preferred derivatives are those wherein the integer n ranges from 1 to about 20 and the metal M is an alkali metal. The invention is illustrated below employing sodium 2-($\beta$-hydroxyethoxy) ethane sulfonate and sodium 2-[$\beta$-($\beta$-hydroxyethoxy)ethoxy] ethane sulfonate, the most preferred derivatives. While general practice is to employ these derivatives as individual components, mixtures of these derivatives may also be employed.

Ordinarily, small amounts of the hydroxy alkylene oxide and hydroxy poly(alkylene oxide) sulfonate materials will be employed. Generally the amounts used will range from about 0.5 to about 5 mol percent based on the theoretically calculated yield of polyester or copolyester resin produced. Preferably from about 1 to about 4 mol percent will be employed. Most preferably from about 1 to about 2.5 mol percent will be employed.

The point at which the derivatives of this invention may be added to the polyester forming process is critical only in the sense that they must be added prior to the polycondensation step of said process. The derivatives must be chemically bound to the polyester in order to be effective and said bonding takes place primarily during the polycondensation step. For this reason the derivatives of this invention may be added at the beginning, during the course of or at the end of the esterification or transesterification step. It has been observed that satisfactory results can be achieved when the derivatives are added immediately prior to carrying out the polycondensation step.

The following examples, in which parts and percentages are by weight unless otherwise indicated illustrate the invention. The intrinsic viscosities were determined on a 0.1 gram sample at 30° C. in a 60/40 phenol/tetrachloroethane solution and are expressed in termos of deciliters per gram (dl/g). Melting points were obtained using a Differential Thermal Analyzer (DTA).

EXAMPLE 1

To a polycondensation reactor were added 60.0 grams (gms) of bis($\beta$-hydroxyethylene) terephthalate, 1.0 gm of a mixture of sodium 2-($\beta$-hydroxyethoxy) ethane sulfonate and sodium 2-[$\beta$-($\beta$-hydroxyethoxy)ethoxy] ethane sulfonate and 0.015 gm of antimony trioxide. This mixture was polymerized for 1.5 hours at 0.5 millimeter of mercury pressure and a temperature of 275° C. to yield a clear polymeric melt of polyethylene terephthalate.

EXAMPLE 2

To a polycondensation reactor were added 63.5 gms (0.25 mol) of bis($\beta$-hydroxyethylene) terephthalate, prepared by the transesterification reaction of dimethyl terephthalate with ethylene glycol, 0.8 gm (2.0 mol percent) of sodium 2-($\beta$-hydroxyethoxy) ethane sulfonate, 1.0 gm of $\omega$-methoxy polyethylene glycol glycidyl ether having a molecular weight of approximately 600, and 0.015 gm of antimony trioxide. This mixture was then polymerized under the usual conditions of elevated temperatures and reduced pressures to yield a clear polymeric polyester of polyethylene terephthalate having an intrinsic viscosity of 0.434 dl/g and a melting point of 257.5° C. Fibers spun from this polyester were dyeable with cationic dyes.

EXAMPLE 3

A cationic dyeable polyethylene terephthalate was prepared in the same manner as in Example 2 above except that 1.18 gms of sodium 2-[$\beta$-($\beta$-hydroxyethoxy)ethoxy] ethane sulfonate were employed in place of the sodium 2-)$\beta$-hydroxyethoxy) ethane sulfonate. A clear polymer having an intrinsic viscosity of 0.408 dl/g and a melting point of 249° C. as determined by DTA analysis was obtained. Fibers produced from this polymer were dyeable with cationic dyes.

EXAMPLE 4

A series of esterification-condensation reaction experiments was carried out to produce four samples of cationic dyeable highly polymeric polyethylene terephthalate. Each polyester sample in the series was prepared as follows: To a 12 gallon reactor were charged 8.65 pounds (lbs) of terephthalic acid, 3.95 lbs of ethylene glycol, 1.6 milliliters (ml) of trisethylene diphosphite, 2.72 gms of pentaerythritol, 2.45 gms of sodium acetate, and 49.7 gms of sodium 5-isophthalic acid. To the reaction mixtures of experiment numbers 1 and 2 were added 139.8 gms of sodium 2-($\beta$-hydroxyethoxy) ethane sulfonate. The reaction mixtures of experiment numbers 3 and 4 contained 185 gms of sodium 2-[$\beta$-($\beta$-hydroxyethoxy)ethoxy] ethane sulfonate. (The ether derivatives were charged at the same time as the other ingredients listed above.) Each batch was then heated between 238° and 250° C. under a nitrogen pressure of 35 pounds per square inch gauge (psig). Water was distilled from the reaction which continued for approximately 145 minutes. Each low molecular weight polyester prepolymer batch was then transferred to a second reactor. To this second reactor was then added 181 gms of polytetramethylene glycol having a molecular weight of 1,000 and 1.136 gms of antimony trioxide. The mixtures were then heated between 270° C. and 280° C. under 0.2 to 1.0 mm of mercury pressure with the elimination of glycol for a period of 120 minutes. The four highly polymeric polyester samples were then melt spun into fibers and dyed with a 2 percent by weight solution of Sevron Red GL (Basic Red 18—C.I.).

The table below contains all pertinent data including Gardner Color Values ($R_d$) which are indicative of the brightness of the polymer and the a and b values which indicate the hues or shades of the polymer ($+a$ = red, $-a$ = green, $+b$ = yellow and $-b$ = blue).

TABLE

| Properties | Experiment Numbers | | | |
|---|---|---|---|---|
| | 1 | 2 | 3 | 4 |
| I.V. (dl/g) | 0.666 | 0.602 | 0.607 | 0.602 |
| M.P. °C. | 219 | 218 | 245 | 242 |
| Denier | 145 | 143 | 149 | 149 |
| Tenacity (g/den) | 3.11 | 2.32 | 2.61 | 3.35 |
| Elongation at Break (%) | 35.2 | 44.4 | 29.3 | 34.1 |
| Shrinkage at Boil (%) | 14.1 | 25.6 | 10.0 | 11.6 |
| $R_d$ | 74.5 | 75.0 | 74.7 | 75.0 |
| a | −0.9 | −0.7 | −0.8 | −0.8 |
| b | +8.3 | +9.5 | +9.1 | +9.7 |

All of the polyethylene terephthalate samples produced above dyed to deep red shades and exhibited good light fastness characteristics.

While certain representative embodiments and details have been shown for the purpose of illustrating the invention it will be apparent those skilled in this art that various changes and modifications may be made therein without departing from the spirit or scope of the invention.

What I claim is:

1. Essentially clear, particle-free cationically dyeable linear polyesters and copolyesters prepared by a multistep process consisting essentially of the esterification or transesterification of a dicarboxylic acid or lower alkyl ester thereof with a polymethylene glycol containing from 2 to 10 methylene groups and polycondensation of the esterification or transesterification product wherein there is added to and reacted with said polycondensing esterification or transesterification product from 0.5 to 5.0 mol percent of at least one compound selected from the group consisting of hydroxyalkylene oxide derivatives and hydroxypoly(alkylene oxide) derivatives of metallic salts of isethionic acid, said derivatives corresponding to the formula HO[($CH_2$)$_x$-

$O]_nCH_2CH_2SO_3M$, where M is an alkali metal, x is an integer ranging from 2 to 10 and n is an integer ranging from 1 to 200.

2. The polyesters and copolyesters of claim 1 in the form of fibers.

3. The polyesters and copolyesters of claim 1 in the form of fabrics.

* * * * *